United States Patent [19]
Morita et al.

[11] Patent Number: 6,097,574
[45] Date of Patent: Aug. 1, 2000

[54] MAGNETIC TAPE CARTRIDGE

[75] Inventors: Kiyoo Morita; Shozo Onmori, both of Kanagawa, Japan

[73] Assignee: Fuji Photo Film Co., Ltd., Kanagawa, Japan

[21] Appl. No.: 09/158,117

[22] Filed: Sep. 22, 1998

[30] Foreign Application Priority Data

Sep. 25, 1997 [JP] Japan .................................. 9-260400

[51] Int. Cl.[7] .................................................. G11B 23/07
[52] U.S. Cl. ........................................................ 360/132
[58] Field of Search ........................... 360/132; 242/348, 242/348.1, 348.2, 348.3, 348.4

[56] References Cited

U.S. PATENT DOCUMENTS 5,180,118   1/1993   Tanaka et al. ............................ 242/199
5,681,002  10/1997   Kikuchi et al. .......................... 242/347

Primary Examiner—Robert S. Tupper
Attorney, Agent, or Firm—Sughrue, Mion, Zinn, Macpeak & Seas, PLLC

[57] ABSTRACT

A magnetic tape cartridge comprises: a single reel 3 around which a magnetic tape is wound; and a cartridge case 2 for accommodating the reel 3 rotatably, the cartridge case 2 including a lower case 60, at the center of the bottom portion of which an opening 2c for driving the reel is formed for exposing the engaging means for driving the reel, the engaging means for driving the reel being formed on an outer surface of the bottom portion of a reel hub, the cartridge case also including an upper case 2a attached to an upper portion of the lower case 60. A crimped surface 62 for reducing a frictional resistance is formed on a side wall 61 of the lower case 60 which slidably comes into contact with a cartridge guide member of a recording and playback device when the magnetic tape cartridge is attached to and detached from a deck. Thereby, it is possible to provide a magnetic tape cartridge that can be smoothly attached to and detached from a deck of a recording and playback device.

5 Claims, 2 Drawing Sheets

MAGNETIC TAPE CARTRIDGE

BACKGROUND OF THE INVENTION

The present invention relates to a magnetic tape cartridge. More particularly, the present invention relates to improvements in a magnetic tape cartridge, in the cartridge case of which a single reel is rotatably accommodated and a magnetic tape is wound around the reel.

There is provided a conventional magnetic tape cartridge used as a recording medium for an external memory of a computer, in which a magnetic tape is wound around a single reel. This magnetic tape cartridge is used for storing data for the computer. Therefore, important data is stored in the magnetic tape cartridge. Accordingly, this magnetic tape cartridge is composed so that problems such as tape jamming can not be caused in the magnetic tape cartridge and so that the magnetic tape can not be carelessly drawn out from the magnetic tape cartridge.

FIG. 2 is a view showing a conventional example of the magnetic tape cartridge.

This magnetic tape cartridge 1 is composed as follows. In the magnetic tape cartridge 1, there is provided a single reel 3 composed of an upper reel 4 and a lower reel 5 which are combined with each other by means of ultrasonic welding. Around the single reel 3, a magnetic tape 20 is wound. There is provided a cartridge case 2 composed of an upper case 2a and a lower case 2b which are fastened to each other with screws 19. In this cartridge case 2, the reel 3 is rotatably accommodated.

The upper reel 4 is formed by molding in such a manner that a cylindrical reel hub 42 having a bottom, around the outer circumference of which the magnetic tape 20 is wound, and a flange portion 43 protruding from the outer circumference of the upper edge of the reel hub 42 in the radial direction are integrally molded. On an outer surface of the bottom portion of the reel hub 42, there are provided engaging teeth which are used as an engaging means for driving the reel. At an outer circumferential edge of the flange portion 43, there is provided a braking gear 43a which engages with reel locks 50, 51 when the rotation of the reel is restricted in the case of not using the magnetic tape cartridge. In this connection, a recess portion of the reel hub 42 having the bottom portion is open to the upside.

The lower reel 5 is formed into a disk-shape, at the center of which an opening 5a is formed into which the outer surface of the bottom portion of the reel hub 42 is inserted. The lower reel 5 is integrated with the upper reel 4 by means of ultrasonic welding.

When the reel 3 composed of the upper reel 4 and the lower reel 5 by integral ultrasonic welding is incorporated into the cartridge case 2, a bearing 6 is press-fitted into the recess having the bottom of the reel hub 42, and further a spring plug 7 is press-fitted into a hole at the center of the bearing 6. A reel spring 8 attached to the spring plug 7 pushes the reel 3 downward and holds it rotatably.

In order to prevent the reel 3 from rotating carelessly when the cartridge is not used, the braking gear 43a is engaged with the reel locks 50, 51 by the action of pushing forces generated by the torsion springs 12. When the magnetic tape cartridge 1 is not used, under the condition that the magnetic tape 20 is completely wound around the reel 3, a leader tape 21 attached to an end of the magnetic tape 20 is engaged with a front end portion of the hook 18 which is incorporated along the side of the cartridge, wherein the leader tape 21 is a means for introducing the magnetic tape 20 into a predetermined tape running passage in the recording and playback device in which the magnetic tape cartridge 1 is used.

On the side walls of the upper case 2a and the lower case 2b which compose the cartridge case 2, there are provided cutout portions 24a, 24b which are formed into an opening 24 from which the magnetic tape 20 is drawn out. At one corner of the opening 24 for drawing out the magnetic tape, there is provided a lid 30 capable of being opened and closed in the direction of the plane of the cartridge around a support shaft 14 and a support shaft boss portion 14a, wherein the lid 30 is appropriately pushed by a torsion spring 15. In order to prevent the rotation of the lid 30 when the cartridge is not used, the lid 30 is engaged with a lid lock 40 which is appropriately pushed by the lid lock spring 16. On the side opposed to the lid 30, there is provided a writing protect piece 17.

When the above magnetic tape cartridge 1 is set in a corresponding external memory of a recording and playback device, a driving means provided in the recording and playback device is engaged with the engaging teeth of the reel 3 exposed in the opening 2c at the center of the lower case 2b. At the same time, the lid 30 is opened by a tape drawing mechanism provided in the recording and playback device. Therefore, the leader tape 21 is drawn into a predetermined position in the tape running passage. In this way, data can be read from and written on the magnetic tape 20.

In this connection, a cartridge guide member (not shown in the drawing) provided in the recording and playback device relatively strongly comes into contact with one portion of the side of the cartridge case 2, that is, a cartridge guide member provided in the recording and playback device relatively strongly comes into contact with an outer circumferential surface of the side wall 2d close to the support shaft boss 14a of the lower case 2b. While the cartridge guide member is coming into contact with this outer circumferential surface of the side wall 2d, the magnetic tape cartridge 1 is guided and it can be set in and taken out from the recording and playback device.

Due to the fluctuation of production of the deck of the recording and playback device and the magnetic tape cartridge 1, a frictional force is increased which is generated between the side wall 2d of the lower case 2b made of polycarbonate containing glass fiber, the sliding property of which is low, and the guide member of the cartridge. Accordingly, there is a possibility that the magnetic tape cartridge 1 can not be ejected smoothly.

When the magnetic tape cartridge 1 is repeatedly inserted into the deck of the external memory of the computer as indicated by arrow A in FIG. 2 or when the magnetic tape cartridge 1 is repeatedly drawn out from the deck of the external memory of the computer as indicated by arrow B, scratches D to deteriorate the appearance are caused in a portion between a pair of system discriminating ribs 80, 81, which are arranged at a predetermined interval, on the side wall 2d with which the guide member comes into contact.

SUMMARY OF THE INVENTION

Accordingly, it is an object of the present invention to solve the above problems, that is, it is an object of the present invention to provide a magnetic tape cartridge that can be smoothly attached to and detached from a deck of a recording and playback device.

The above object of the present invention can be accomplished by a magnetic tape cartridge comprising: a single reel around which a magnetic tape is wound, an engaging means for driving the reel being provided on an outer surface of a bottom portion of a hub of the reel; and a cartridge case for accommodating the reel rotatably, the cartridge case including a lower case, at the center of the bottom portion of which an opening for driving the reel is formed for exposing the engaging means for driving the reel, the cartridge case also including an upper case attached to an upper portion of the lower case, wherein an irregular surface for reducing a frictional resistance is formed at least in a portion on a side of the cartridge case which slidably comes into contact with a cartridge guide member of a recording and playback device when the magnetic tape cartridge is attached to and detached from a deck.

According to the above structure, a portion of the side of the cartridge case, which slidably comes into contact with the cartridge guide member of the recording and playback device when the magnetic tape cartridge is attached to and detached from the deck, is formed into an irregular surface, so that a frictional resistance can be decreased. Further, by the effect of providing the irregular surface, the occurrence of remarkable scratches to deteriorate the appearance can be reduced.

In this connection, it is preferable that the above irregular surface is a crimped surface, the surface roughness (Rz) of which is 7 μm to 25 μm.

Also, it is preferable that the above irregular surface is a knurled irregular surface that is formed in the attaching direction of the cartridge to the deck.

DETAILED DESCRIPTION OF THE PREFERRED EMBODIMENTS

Figure 1:
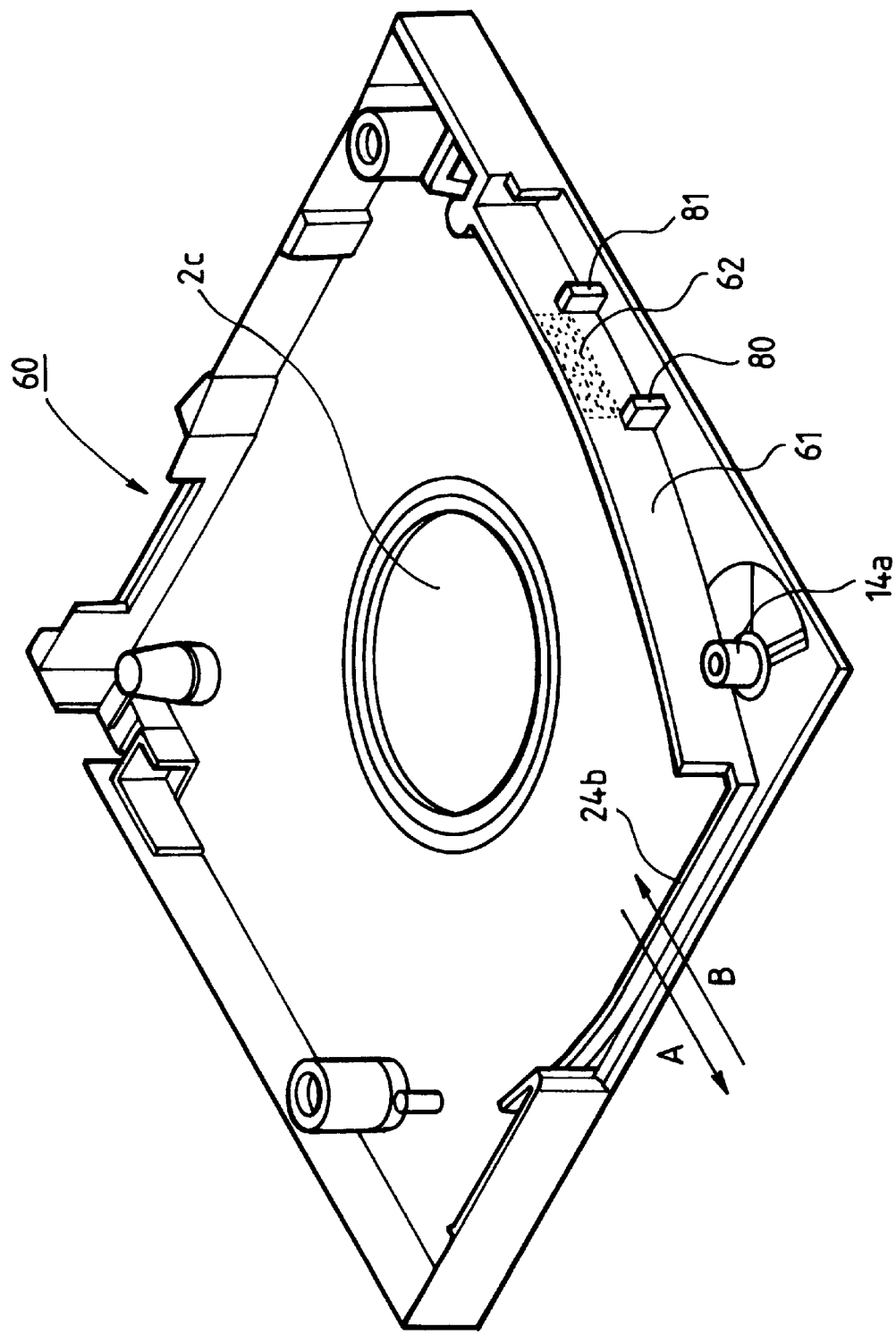
FIG. 1 is an overall arrangement perspective view showing a lower case of the magnetic tape cartridge of the present invention.

Referring to the accompanying drawings, an embodiment of the magnetic tape cartridge of the present invention will be described in detail below. In this connection, except for the lower case 60, the structure of the magnetic tape cartridge of the present invention is the same as the structure of the conventional magnetic tape cartridge shown in FIG. 2. Therefore, like reference characters are used to indicate like parts in FIGS. 1 and 2, and the detailed explanation will be omitted here.

Figure 2:
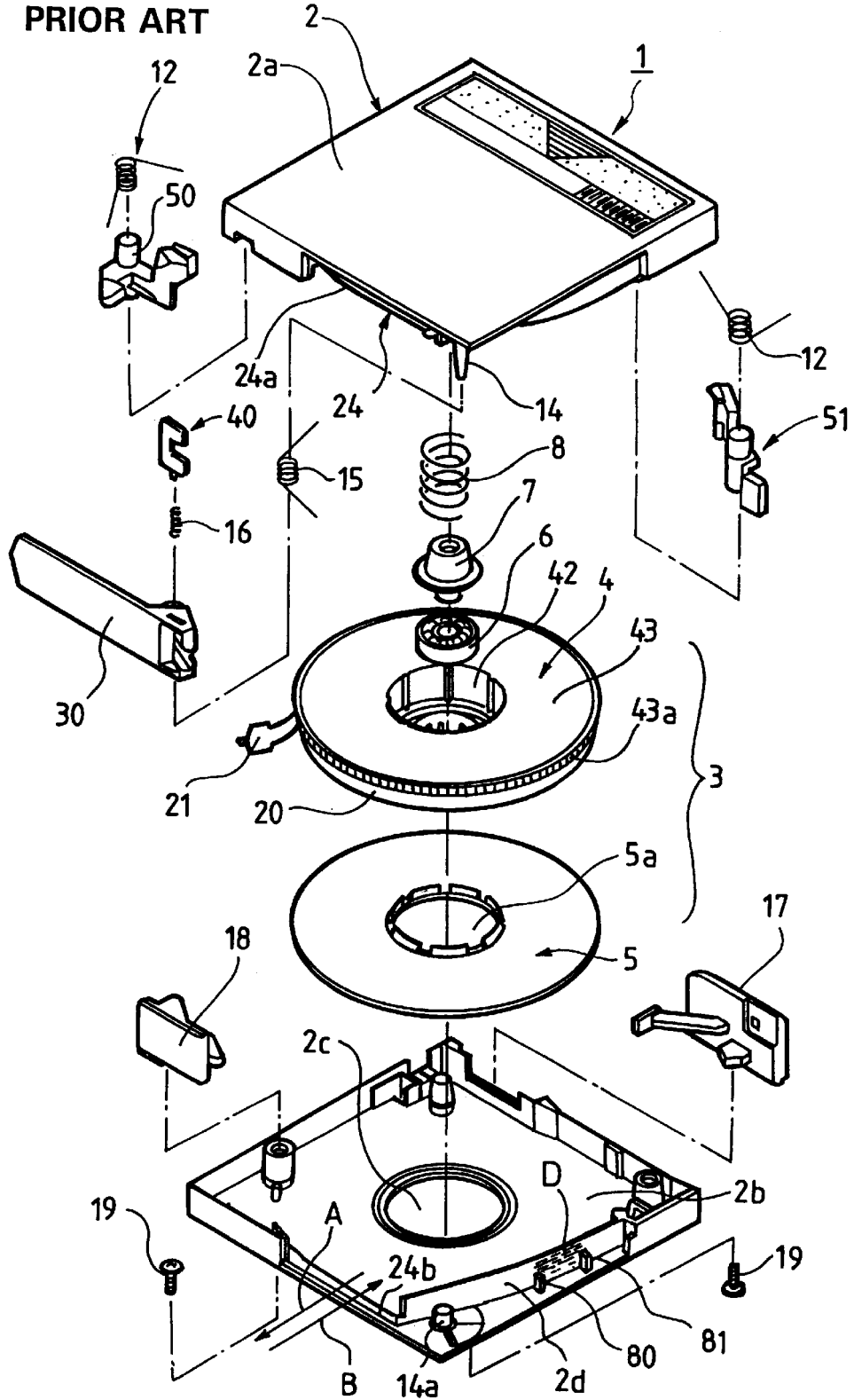
FIG. 2 is an exploded perspective view showing a conventional magnetic tape cartridge in which a single reel is used.

In the same manner as that of the lower case 2b of the conventional magnetic tape cartridge 1 shown in FIG. 2, the lower case 60 of the magnetic tape cartridge of the present invention forms a flat cartridge case together with the upper case 2a. On one side wall of the cartridge case, there is provided a cutout portion 24b used as an opening 24 from which the magnetic tape 20 is drawn out.

Between a pair of system discriminating ribs 80, 81 provided at a predetermined interval on the side wall 61 of the lower case 60, there is formed a crimped surface 62 which is an irregular surface.

The above crimped surface 62 is formed in such a manner that an inner surface of a cavity of a metallic molding die is formed by a mat finish, that is, what is called a crimped processing is conducted on the surface. In this case, a portion of the metallic die used for forming the side wall 61 of the lower case 60 is composed of an insert die so that the system discriminating ribs 80, 81, the interval of which changes in accordance with the specification of the cartridge, can be easily molded.

Accordingly, only when an insert die, the inside of the cavity of which is a mat surface, is used, it is possible to form the crimped surface 62 while the metallic molding die for the conventional lower case 2b is used as it is.

When a portion of the metallic molding die close to the system discriminating ribs 80, 81 is formed by a sliding core, the inside of the cavity of the sliding core is formed into a mat surface. In this way, the crimped surface 62 may be formed.

According to the magnetic tape cartridge provided with the above lower case 60, when the magnetic tape cartridge is attached to the deck of the recording and playback device in the direction of arrow A, or when the magnetic tape cartridge is detached from the deck of the recording and playback device in the direction of arrow B, there is provided a crimped surface 62 to reduce a frictional resistance in a portion close to the system discriminating ribs 80, 81 on the side wall 61 which slidably comes into contact with the cartridge guide member not shown in the drawing. Therefore, even when an excessively strong contact force is given between the side wall and the cartridge guide member due to the fluctuation of production of the deck of the recording and playback device and the magnetic tape cartridge, it is possible to reduce a frictional force generated between the side wall 61 and the cartridge member by the action of the crimped surface 62. Accordingly, it is possible to prevent the failure in ejection of the magnetic tape cartridge.

Even when scratches are caused on the magnetic tape between a portion close to the system discriminating ribs 80, 81 on the side wall 61 and the cartridge guide member by the repetition of attaching and detaching motion of the magnetic tape cartridge to the deck, it is difficult to visually recognize the scratches by the effect of providing the rough pattern on the crimped surface 62. Consequently, there is no possibility that the appearance is remarkably deteriorated.

From the viewpoint of attaching and detaching the magnetic tape cartridge appropriately and also from the viewpoint of stabilizing the formation of the magnetic tape cartridge, which is based on the result of an experiment, it is preferable that the surface roughness (Rz: value of cut off=0.8 mm) is set at 7 μm to 25 μm.

In this connection, the irregular surface used in the present invention is not limited to the crimped surface 62 of a mat finish, but knurled irregularities may be formed in the direction of attaching and detaching the magnetic tape cartridge to the deck.

In this connection, the irregular surface is not necessarily formed only in a portion close to the system discriminating ribs 80, 81 on the side wall 61 like the crimped surface 62 shown in the above embodiment, but the irregular surface may be formed on the overall surface of the side wall 61.

According to the magnetic tape cartridge of the present invention, the side of the cartridge case, with which the cartridge guide member of the recording and playback device slidably comes into contact an the case of attaching and detaching the magnetic tape cartridge to and from the recording and playback device, is formed into an irregular surface. Therefore, a frictional resistance on the side of the cartridge case can be reduced. Accordingly, even if the side of the cartridge case is too strongly contacted with the cartridge guide member, the frictional force can be decreased by the effect of the irregular surface. Accordingly, it is possible to prevent the failure of ejection of the magnetic tape cartridge.

Even when scratches are caused between a portion on the side of the cartridge case and the cartridge guide member by the repetition of motion of attaching and detaching the cartridge to the deck, it is difficult to visually recognize the scratches by the effect of the rough pattern of the irregular surface. Accordingly, the appearance can not be deteriorated.

Therefore, it is possible to provide a magnetic cartridge tape which can be more smoothly attached to and detached from the deck of the recording and playback device.

While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

What is claimed is:

1. A magnetic tape cartridge comprising:

a single reel around which a magnetic tape is wound, said single reel having a hub portion an outer surface of a bottom portion of which is provided with an engaging means being engagable with a reel driving mechanism of a recording and playback device; and a cartridge case for accommodating said single reel rotatably, said cartridge case including a lower case and an upper case attached to an upper portion of said lower case, in which said lower case has an opening through which said engaging means is exposed, wherein a side wall of said cartridge case has an irregular surface for reducing a friction resistance, and said irregular surface is provided at at least a portion which slidably comes into contact with a cartridge guide member of said recording and playback device when said magnetic tape cartridge is attached to and detached from the same.

2. The magnetic tape cartridge according to claim 1, in which the irregular surface is a crimped surface.

3. The magnetic tape cartridge according to claim 1, in which the surface roughness (Rz) of said crimped surface is in a range from 7 $\mu$m to 25 $\mu$m.

4. The magnetic tape cartridge according to claim 1, in which said irregular surface is a knurled irregular surface that is formed in the attaching direction of the cartridge to the deck.

5. The magnetic tape cartridge according to claim 1, in which said irregular surface is formed on the overall surface of said side wall.

* * * * *